June 8, 1943.  C. O. CHALLAND  2,321,359
HARROW
Filed Aug. 4, 1941

Charles O. Challand
INVENTOR.

BY Clarence E. Threedy
HIS ATTORNEY.

Patented June 8, 1943

2,321,359

UNITED STATES PATENT OFFICE 2,321,359

HARROW

Charles O. Challand, De Kalb, Ill.

Application August 4, 1941, Serial No. 405,303

4 Claims. (Cl. 55—103)

This invention relates to improvements in harrows, which improvement is highly advantageous in use and operation, economical in manufacture and simple in structure.

It is an object of this invention to provide in harrowing tools a simple arrangement of parts which will facilitate the raking and breaking down of the soil without carrying away any of the soil particles in the process of harrowing.

It is a further object of my invention to provide a harrowing tool which is adapted for harrowing operation after planting and which is no way will affect the top surface of the soil between the rake teeth such as to disturb the germination of already planted seed.

Other objects and advantages will appear more fully in the light of the following specification in view of the drawing, in which.

Figure 3:
Fig. 3 is a diagrammatic side elevational view of an old type harrow over which my structure is an improvement.

Heretofore harrowing devices have been constructed substantially as illustrated in Fig. 3, with the rows of harrowing teeth each of substantially the same length. This arrangement of parts, while satisfactory in certain instances, is subject to many objections, such as to limit the uses to which it may be put. In these old type harrowing implements, it will be noted, as diagrammatically illustrated in Fig. 3, that as the soil is broken down by the leading row of harrow teeth the particles of soil are gradually refined as each successive row of teeth passes through the soil, such that the trailing rows of harrowing teeth will either drag upon the top surface of the soil or the already broken down particles of the soil will by nature cling to the rake teeth as well as the crossbeam upon which the teeth are mounted, thereby causing a sweeping action over the entire top surface of the soil being worked. With the soil clinging to these trailing rows of teeth, the implement neither leaves the top surface desired, nor does it permit the use of such old type harrow in fields where the crops have already been planted.

Figure 1:
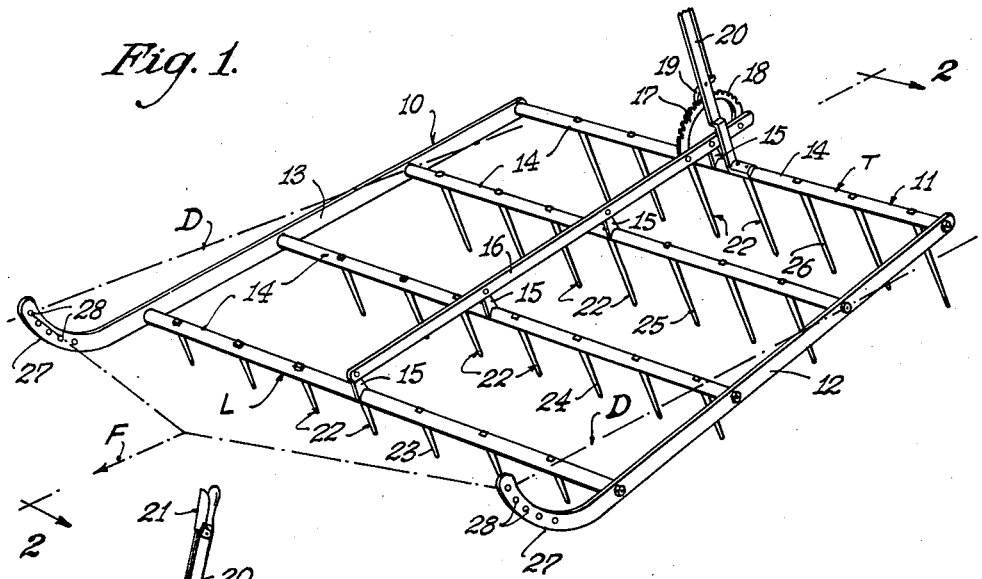
Fig. 1 is a perspective view of my new harrow structure.

My new harrow structure is best illustrated in Fig. 1 wherein the harrow is generally indicated at 10 and as constituting a frame 11 comprising a pair of spaced side rails 12 and 13 arranged in parallelism with respect to each other and adapted to support a plurality of crossbeams 14 preferably equidistant with respect to each other.

The crossbeams 14 are rockably mounted at their ends in the side rails 12 and 13 and each has a lever arm 15 extending upwardly from its mid portion, which lever arm has pivotal connection with a common linkage 16 having at one end thereof a segment 17 with a notched periphery 18 adapted to receive a latch tooth 19 on a hand control lever 20. This hand control lever is fixedly mounted on the rearmost one of the crossbeams 14 such that upon swinging movement of the lever 20, the rearmost crossbeam will rock corresponding to the swinging motion of the lever 20. The lever arm 20 is provided with a latch-releasing hand grip 21 spring-urged to a normal position for retaining the latch 19 in engagement with the notched periphery 18 of the segment 17 such that a person, upon grasping the grip 21, releases the lever 20 for swinging movement as aforesaid, and by reason of the interconnection of the several crossbeams 14 through the link 16 and levers 15 all of the crossbeams will rock in unison.

There is arranged on each of the crossbeams 14 a plurality of spaced spike teeth 22, the arrangement being such that the crossbeam 14 at the leading end of the frame 11 is provided with spike teeth 23 of a relatively stubby nature. These spike teeth on the first row are of a uniform length, each being adapted to engage into the soil worked upon substantially the greater portion of their length. The next succeeding row of spike teeth 22 arranged on the second crossbeam is indicated at 24 and these teeth are of a length substantially greater than that of the preceding row of teeth 23 and are adapted to pierce the soil such that a portion of the teeth are exposed above the top surface of the soil. The harrow teeth on the third crossbeam 14 from the front are indicated at 25 and are of a length proportionately greater than those of the next preceding row of teeth 24 such that a greater proportion of the length of the teeth 25 will be exposed above the top surface of the soil; and the teeth 26 on the trailing crossbeam 14 of the frame are substantially longer than those in the preceding rows of teeth such that a greater portion of the length of these trailing teeth 26 will be exposed above the top surface of the soil.

Figure 2:
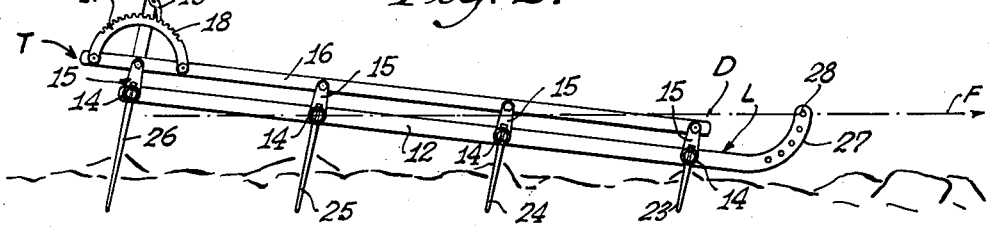
Fig. 2 is a longitudinal sectional detail through the same as seen substantially along line 2—2 of Fig. 1.

As will be noted in Fig. 2 of the drawing, each row of teeth are graduated in length, such length increasing from front to rear such that the leading end L of the frame 11 is disposed a slight distance above the top surface of the soil, while the trailing end T of this frame 11 will be spaced from such top surface at a point substantially higher than the leading end L.

The arrangement of parts provides a harrow 10 having a center of gravity approximately at the axis of the crossbeam 14 supporting the third row of teeth 25 in the frame. By reason of the center of gravity being thus positioned with respect to the frame structure 11, the line of drag, illustrated by the dot-dash line D, will be in a plane struck through such center of gravity and horizontal with respect to the top surface of the soil. To this end the leading end L of the frame is provided with a novel adjustable hitch which comprises an upturned portion 27 on each of the side rails 12 and 13. Each of these upturned ends 27 has formed therein hitching apertures 28 in spaced relation with respect to each other.

As shown in Figs. 1 and 2, when the harrow teeth 22 are adjusted into substantially fully extended condition, the line of drag D will extend through the uppermost hitching aperture 28. In order to balance the frame structure in accordance with the line of force F created by any one of a number of well known pulling mediums, the tug-lines (not shown) of such pulling medium are hitched to the upturned end 27 within the aperture 28 thereof disposed along the line of drag (i. e. in the present instance, the uppermost one of the apertures 28). Should the control lever 20 be manipulated in a clockwise direction (Fig. 2) to change the angle of the spike teeth 22 with respect to the frame 11, the side rails 12 and 13 will be disposed at a lesser angle with respect to the horizontal than that angle shown in Fig. 2 and by reason thereof the line of drag D will extend through a different one of the hitching apertures 28, thus making such aperture the most desirable one for hitching to the tug-lines of the pulling medium.

Having pointed out the structural characteristics of my new harrow unit, it will be readily seen that I have provided a novel arrangement of parts whereby harrowing may be done without causing a sweeping action over the top surface of the soil worked upon and that regardless of the soil conditions, only the spike teeth 22 themselves have an effect upon the soil because the crossbeams are kept out of contact with the soil, thereby preventing the finer particles of earth from clinging to the trailing rows of the harrow. It will be further noted that by this arrangement of graduated teeth in harrow structures, I have provided a harrow which may be used to cultivate already planted fields without fear of disturbing the rows of germinating seeds, there being no possibility of a drag over the top surface of soil between the spike teeth whereby to disturb the seeds or the sprouts beginning to break through.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a harrow comprising a frame having spaced side rails supporting a series of parallelly arranged crossbeams, the provision of harrow teeth for said crossbeams with the teeth on each of said successive crossbeams being substantially longer than the teeth on the preceding crossbeam whereby to dispose the line of pull on said frame at an angle with respect to said side rails, and means on the leading end of said side rails providing a tug line hitch at a point substantially horizontal to a plane struck through the center of gravity of said frame and parallel to said line of pull.

2. In a harrow comprising a frame having spaced side rails supporting a series of parallelly arranged crossbeams, the provision of harrow teeth for said crossbeams with the teeth on each of said successive crossbeams being substantially longer than the teeth on the preceding crossbeam whereby to dispose the line of pull on said frame at an angle with respect to said side rails, so that the teeth on the leading beam will be embedded in the soil being harrowed and each succeeding row of teeth will have a lesser proportion of its length embedded in the aforesaid soil to prevent the gradually refined soil particles from clinging to the trailing end of the frame, said side rails having their leading ends upturned to provide a hitch at a point substantially horizontal with respect to the center of gravity of said harrow frame.

3. In a harrow comprising a frame having spaced side rails supporting a series of parallelly arranged crossbeams adapted to be rocked about their long axes, and a control lever for rocking said crossbeams, the provision of harrow teeth for said crossbeams with the teeth on each of said successive crossbeams being substantially longer than the teeth on the preceding crossbeam whereby to disposed the line of pull on said frame at an angle with respect to said side rails, said side rails having upturned leading ends provided with a plurality of hitch formations, whereby to hitch said side rails to a pulling means at a point substantially horizontal with respect to the center of gravity of said frame.

4. In a harrowing implement adapted for harrowing soil after seed has been planted therein and including a frame having spaced side rails supporting a series of parallelly arranged crossbeams, harrow teeth arranged on said crossbeams with the teeth on each successive crossbeam being substantially longer than the teeth on the preceding crossbeam whereby the teeth on the foremost crossbeam will be substantially embedded in, and each row of teeth on succeeding crossbeams have a lesser proportion of their length disposed within the soil being harrowed to dispose said side rails at an inclination from front to rear of said frame and to maintain said crossbeams well above the top surface of the soil to prevent dragging of said crossbeams thereon between said harrow teeth, and means on the leading end of said side rails providing a tug line hitch at a point substantially horizontal to a plane struck through the center of gravity of said frame.

CHARLES O. CHALLAND.